United States Patent [19]

Uchino

[11] Patent Number: 4,658,850

[45] Date of Patent: Apr. 21, 1987

[54] FLOW CONTROL VALVE WITH SWITCHING VALVE

[75] Inventor: Kazuyoshi Uchino, Saitama, Japan

[73] Assignee: Jidosha Kiki Co., Ltd., Tokyo, Japan

[21] Appl. No.: 800,482

[22] Filed: Nov. 21, 1985

[30] Foreign Application Priority Data

Dec. 10, 1984 [JP] Japan .............................. 59-186915

[51] Int. Cl.[4] ............................................. G05D 7/01
[52] U.S. Cl. ...................................... 137/101; 60/422
[58] Field of Search ........................... 137/101; 60/422

[56] References Cited

U.S. PATENT DOCUMENTS

| | | | |
|---|---|---|---|
| 3,200,830 | 8/1965 | Moyer | 137/101 |
| 3,456,560 | 7/1969 | Brannon | 137/101 X |
| 3,818,926 | 6/1974 | Wohlwend | 137/101 |
| 3,983,893 | 10/1976 | Nubson | 137/101 |

FOREIGN PATENT DOCUMENTS 886022 1/1962 United Kingdom ................ 137/101

Primary Examiner—Robert G. Nilson
Attorney, Agent, or Firm—Flynn, Thiel, Boutell & Tanis

[57] ABSTRACT

A flow control valve comprises an orifice which is formed in a supply passage of hydraulic fluid, and a spool valve for feeding part of hydraulic fluid supplied through the supply passage to a branch passage in response to a pressure differential across the orifice. A switching valve which switches a fluid circuit is assembled with the flow control valve. The switching valve comprises drive means which is directly and mechanically coupled to the spool valve for forcibly causing a displacement of the spool valve to open the branch passage while closing the supply passage. Hydraulic fluid is normally supplied through the supply passage, but when the drive means is actuated, hydraulic fluid can be supplied only to the branch passage. In alternate form, the drive means controls the opening or closing of the supply passage, and fluid pressure which obtains when the supply passage is closed is indirectly utilized to cause a displacement of the spool valve, thus opening the branch passage and closing the supply passage.

5 Claims, 3 Drawing Figures

FLOW CONTROL VALVE WITH SWITCHING VALVE

FIELD OF THE INVENTION

The invention relates to a flow control valve with a switching valve, and more particularly, to a combination of a switching valve which switches a fluid circuit and a flow control valve which controls the flow rate of hydraulic fluid supplied to a hydraulic instrument.

DESCRIPTION OF THE PRIOR ART

A variety of switching valves which switch fluid circuits and a variety of flow control valves which control the flow rate of hydraulic fluid supplied to hydraulic instruments are proposed in the prior art.

It may be required to provide such a switching valve and a flow control valve simultaneously, as when a vehicle having a power steering apparatus includes a fluid circuit such as a hydraulic winch, a hydraulic lifter or a hydraulic dumper. In such fluid circuit, the switching valve is disposed upstream of the flow control valve or toward a pump. When the vehicle is at rest where the operation of the power steering apparatus is normally unnecessary, the fluid circuit is switched to supply the entire flow of hydraulic fluid from the pump to a hydraulic winch, for example.

On the other hand, the flow control valve is intended for use with the power steering apparatus so that when the flow rate of hydraulic fluid supplied from the pump to the power steering apparatus exceeds a given value, the flow control valve may operate to return part of such hydraulic fluid to the pump, thus maintaining the supply to the power steering apparatus substantially constant. In such instance, a flow control valve having a drooping characteristic is employed. It enables the supply of hydraulic fluid to the power steering apparatus to be reduced if the flow rate of hydraulic fluid which is supplied from the pump to the flow control valve exceeds the given value and continues to increase.

In the prior art practice, the switching valve and the flow control valve have been provided separately and interconnected through a conduit, resulting in an expensive arrangement and requiring a complex plumbing operation.

SUMMARY OF THE INVENTION

In view of the foregoing, the invention provides an integral combination of a switching valve and a flow control valve which can be manufactured inexpensively and which facilitates a plumbing operation.

Specifically, the invention is based on a flow control valve having an orifice which is formed in a supply passage of hydraulic fluid and having a spool valve which branches part of the hydraulic fluid through the supply passage to a branch passage in response to a pressure difference across the orifice. Drive means is combined with the flow control valve to cause a displacement of the spool valve either directly or indirectly to open the branch passage and to close the supply passage.

With this construction, under the normal condition, the spool valve may operate freely in response to a pressure difference across the orifice, allowing the full functioning as the flow control valve. Accordingly, when a power steering apparatus is connected to the supply passage, the flow rate of hydraulic fluid which is supplied from a pump to the power steering apparatus can be controlled.

On the other hand, when the drive means is operated to cause a displacement of the spool valve so that the branch passage is opened and the supply passage is closed, a hydraulic winch connected to the branch passage may be fed with the hydraulic fluid from the pump. In accordance with the invention, it is also possible to operate the hydraulic winch by an excess amount of hydraulic fluid which is passed through the branch passage when the spool valve is allowed to operate freely or while the hydraulic fluid is being supplied to the power steering apparatus.

In this manner, the invention allows the combined switching and flow control valve to be manufactured more inexpensively than they are provided separately while simultaneously simplifying the plumbing operation.

Above and other objects, features and advantages of the invention will become apparent from the following description of several embodiments thereof shown in the drawings.

DETAILED DESCRIPTION OF EMBODIMENTS

Figure 1:
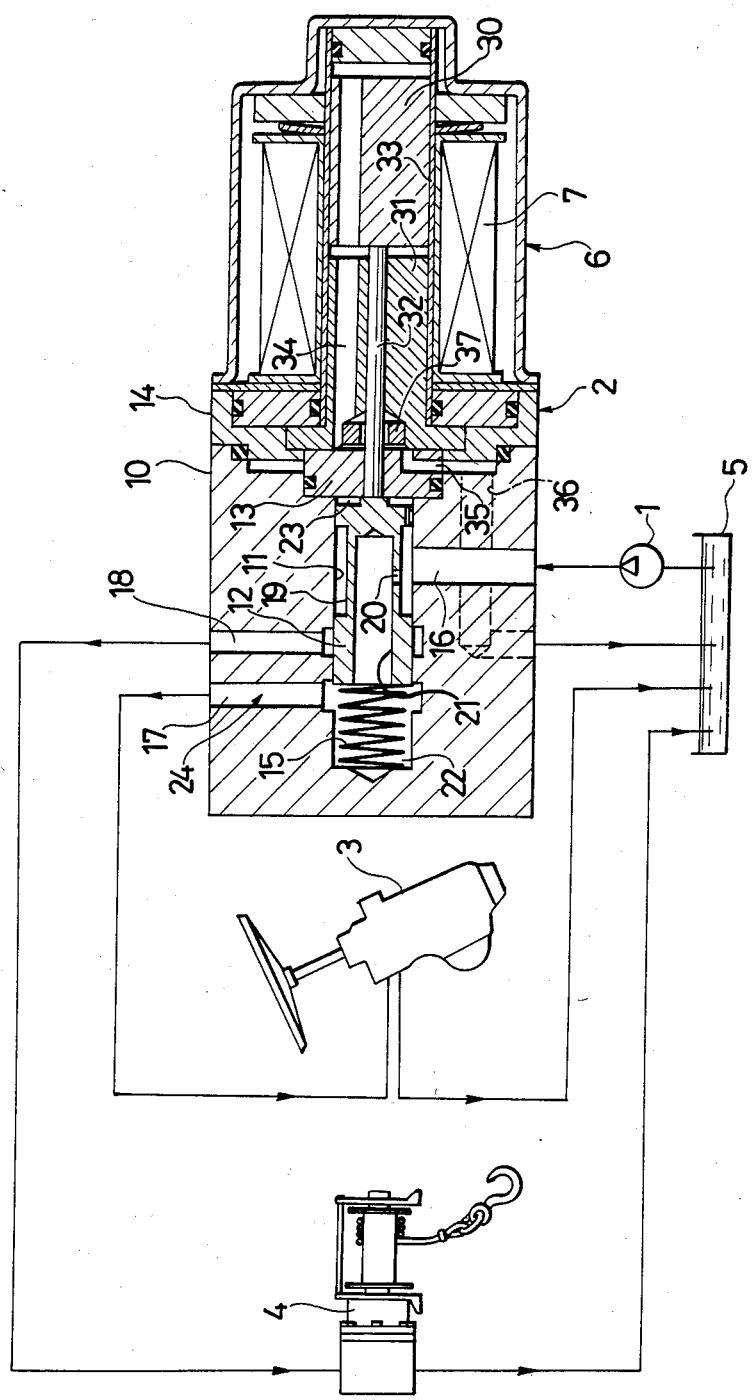
FIG. 1 is a cross section of one embodiment of the invention.

Referring to the drawings, and more particularly to FIG. 1, there is shown a flow control valve with switching valve according to one embodiment of the invention. A pump 1 is associated with a flow control valve with switching valve 2, which normally functions as a flow control valve providing a constant flow rate. It supplies hydraulic fluid from the pump 1 to a power steering apparatus 3, and also supplies an excess amount of hydraulic fluid to a hydraulic winch 4 which is provided with an operating control valve, not shown. It will be appreciated that the hydraulic fluid supplied to the power steering apparatus 3 and the hydraulic winch 4 are returned to a reservoir 5 for the pump 1.

The combined valve 2 is capable of supplying the entire flow of hydraulic fluid from the pump 1 to the hydraulic winch 4 while interrupting the supply of hydraulic fluid to the power steering apparatus 3 when a solenoid 7 which constitutes drive means 6, to be described later, is energized.

Specifically describing the construction of the combined valve 2, it includes a housing 10 in which a bore 11 is formed which is closed at one end. A spool valve 12 is slidably fitted in the bore 11, and an opening at the right end of the bore 11 is closed by a lid 13. The lid 13 is held closed by a plate 14 of the drive means 6 which is secured to the housing 10. A spring 15 is disposed in the bottom of the bore to urge the right end face of the spool valve 12 into abutment against the lid 13.

Three passages 16, 17 and 18 which are formed to extend through the housing 10 at axially offset positions, open into the bore 11, the first passage 16 which is located rightmost being connected to the discharge port of the pump 1. The first passage 16 is maintained in communication with an annular groove 19 which is formed around the periphery of the spool valve 12 toward its right end, and the annular groove 19 is maintained in communication with a low pressure chamber 22 in which the spring 15 is received through a radial orifice 20 formed in the spool valve 12 and an axially extending internal passage 21 formed in the spool valve 12. The annular groove 19 is also in communication with a high pressure chamber 23 which is located at the opposite end from the low pressure chamber 22 through a path formed to extend through the spool valve 12.

The second passage 17 which is located leftmost is connected to the power steering apparatus 3, and communicates with the low pressure chamber 22 when the spool valve 12 is located at its end of rightward stroke and when it has moved a given distance to the left from such end. However, when the spool valve 12 moves through an increased stroke to the left, the communication between the second passage 17 and the low pressure chamber 22 is interrupted by the spool valve 12. A combination of the first passage 16, the annular groove 19, the orifice 20, the internal passage 21, the low pressure chamber 22 and the second passage 17 defined together a supply passage 24 which feeds hydraulic fluid from the pump 1 to the power steering apparatus 3.

The third passage located intermediate the first and the second passage 16, 17 represents a branch passage 18 which is connected to the hydraulic winch 4. The opening of the branch passage 18 is closed by the peripheral surface of the spool valve 12 when the latter is located at its end of rightward stroke, but the branch passage 18 communicates with the annular groove 19 when the spool valve 12 is driven to the left against the resilience of the spring 15.

Considering the drive means 6, it comprises the solenoid 7 mentioned above and a plunger 30 which is driven to the left when the solenoid 7 is energized. The plunger 30 is in direct mechanical connection with the spool valve 12 by means of an actuating member 32 which slidably extends through a cylindrical holder 31, defined by part of the plate 14, and through the lid 13.

The plunger 30 is slidably received in a pipe 33, which is maintained in liquid tightness against the exterior by means of a plurality of seal members. The interior of the pipe 33 communicates with the reservoir 5 associated with the pump 1 through a passage 34 formed in the holder 31, a passage 35 formed in the lid 13 and a passage 36 formed in the housing 10.

An annular magnet 37 is disposed in the axial portion of the holder 31 at a position close to the lid 13 and allows the actuating member 32 to extend therethrough. The magnet 37 functions to attract any iron powder which may be contained in the fluid that may leak through the clearance between the lid 13 and the actuating member 32 from the high pressure chamber 23, thus preventing such iron powder from ingress onto the sliding surface of the plunger 30.

In operation, under the normal condition when the solenoid 7 is deenergized, the entire amount of hydraulic fluid which is discharged by the pump 1 is supplied to the power steering apparatus 3 through the supply passage 24 and then returned therefrom to the reservoir 5 when the discharge is at a low level.

When the flow rate of hydraulic fluid discharged from the pump 1 increases, a pressure differential across the orifice 20 formed in the spool valve 12, and hence the pressure difference between the high pressure chamber 23 and the low pressure chamber 22 increases, causing the spool valve 12 to be driven to the left against the resilience of the spring 15. The annular groove 19 formed around the spool valve 12 then communicates with the branch passage 18 to divert part of hydraulic fluid to the branch passage 18, thus maintaining the flow rate of hydraulic fluid supplied to the power steering apparatus 3 substantially constant, in a similar manner as with a conventional flow control valve.

At this time, hydraulic fluid from the branch passage 18 is supplied to the hydraulic winch 4 to allow it to be operated before being returned to the reservoir 5 while assuring a proper functioning of the power steering apparatus 3.

On the other hand, when the solenoid 7 is energized, the plunger 30 is actuated to drive the spool valve 12 to the left through the actuating member 32, whereby the spool valve 12 closes the opening of the passage 17 which forms part of the supply passage 24 and the annular groove 19 is fully in overlapping relationship with the branch passage 18 to allow the hydraulic fluid from the pump to be supplied in its entirety to the hydraulic winch 4, by switching the fluid circuit.

It is to be understood that the drive applied to the plunger 30 by the solenoid 7 is chosen to be less than the drive applied to the actuating member 32 to move it to the right when the power steering apparatus 3 is in operation, thereby preventing the fluid circuit from being switched if the solenoid 7 is energized when the power steering apparatus 3 is in operation.

Figure 2:
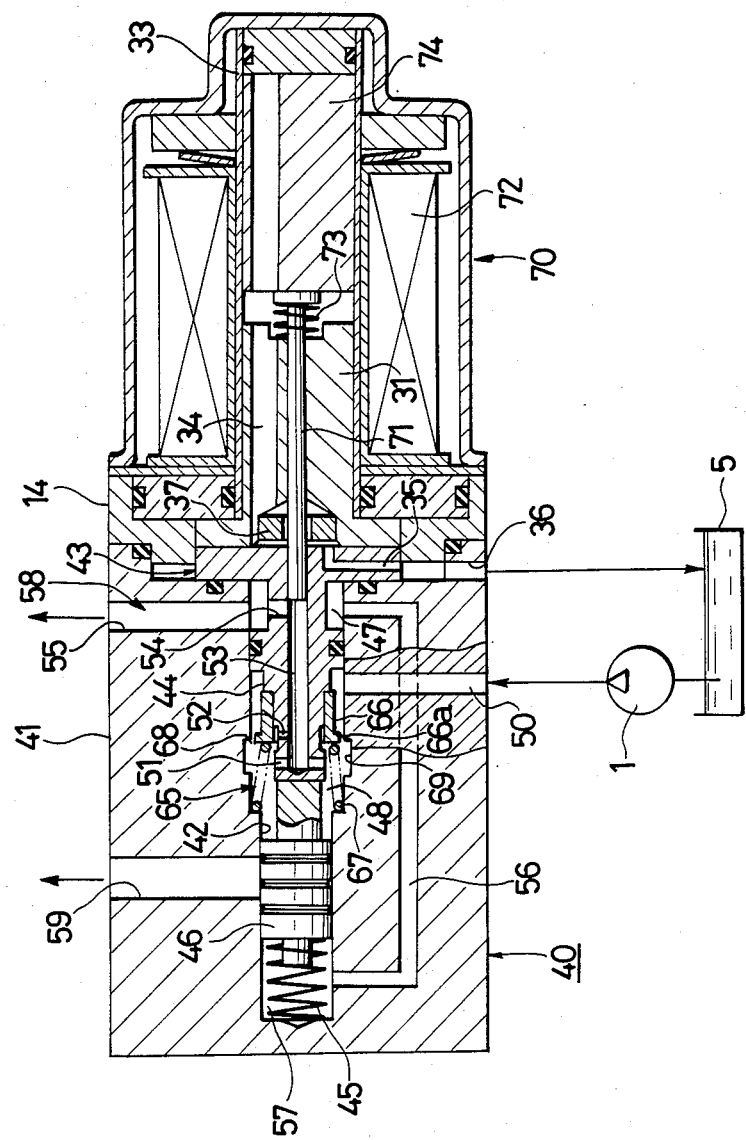
FIGS. 2 and 3 are similar cross sections of other embodiments of the invention.

FIG. 2 shows a flow control valve with switching valve 40 according to another embodiment of the invention which exhibits a drooping characteristic that acts to reduce the flow rate of hydraulic fluid supplied to the power steering apparatus as the flow rate of hydraulic fluid which is discharged from the pump 1 increases.

Referring to FIG. 2, the combined valve 40 includes a housing 41 in which a bore 42 is formed which is closed at its one end. The opening of the bore 42 is closed by a lid 43 having a projection 44 which extends into the bore 42. A spring 45 disposed within the bore adjacent to the closed end thereof urges the right end face of a spool valve 46 into abutment against the free end of the projection 44. The projection 44 includes a portion of a reduced diameter which is loosely fitted in the bore 42 and an axially median portion of an increased diameter which is a close fit in the bore 42 to maintain liquid tightness thereof, thus defining a low pressure chamber 47 and a high pressure chamber 48 on the right and the left side thereof.

A first passage 50 formed in the housing 41 is connected to the pump 1 and communicates with the high pressure chamber 48, which is in communication with the low pressure chamber 47 through a pair of radially extending orifices 51, 52 formed adjacent to the left end, an axial bore 53 and a radial passage 54, all formed in the projection 44. The low pressure chamber 47 communicates with a power steering apparatus through a second passage 55 formed in the housing 41. The low pressure chamber 47 is also in communication with another low pressure chamber 57 located to the left of the spool valve 46 through a passage 56.

Thus, in this embodiment, a supply passage 58 which supplies hydraulic fluid from the pump 1 to a power steering apparatus comprises the first passage 50, the high pressure chamber 48, the pair of orifices 51, 52, the axial bore 53, the radial passage 54, the low pressure chamber 47 and the second passage 55. It is to be understood that a branch passage 59 is connected to a hydraulic winch in the same manner as before, and has its opening closed by the peripheral surface of the spool valve 46 when the spool valve 46 is located at its end of rightward stroke. However, the branch passage 59 communicates with the high pressure chamber 48 when the spool valve 46 is driven to the left against the resilience of the spring 45.

In this embodiment, the pair of orifices 51, 52 form a variable orifice mechanism 65, which additionally includes a sleeve 66 which is slidably fitted around the projection 44 within the high pressure chamber 48 and which is normally urged to its rightmost position by a spring 67.

The sleeve 66 has a flange 66a, which cooperates with the internal surface of the bore 42 to define a restriction 68 having a given flow channel area. The first passage 50 opens into the bore at a location upstream of or to the right of the restriction 68. Accordingly, a pressure differential is produced between the upstream and the downstream side of the restriction 68 as hydraulic fluid passes therethrough, and is effective to cause a sliding movement of the sleeve 66 against the resilience of the spring 67, thus allowing a control over the flow channel area of the orifice 52.

An annular groove 69 is formed in the internal surface of the bore 42 at a location close to the left end face of the sleeve 66 when it is disposed at its end of rightward stroke, thereby allowing a gradual increase in the flow channel area exhibited by the restriction 68 as the sleeve 66 is driven to the left and preventing any further restriction of the hydraulic fluid than is required. It is to be noted that a flange 66a on the sleeve 66 may be omitted, and the sleeve 66 may be simply cylindrical in configuration to achieve a similar effect.

An actuating member 71 of drive means 70 is slidably fitted in the axial bore 53 within the projection 44, and when a solenoid 72 is deenergized, a spring 73 urges and maintains the actuating member 71 at its end of rightward stroke with the left end of the actuating member 71 disposed at its righthand position close to the passage 54 which forms part of the supply 58. However, when the solenoid 72 is energized, a plunger 74 is operated to drive the actuating member 72 to the left to close the opening of the passage 54, thus permitting the supply passage 58 to be completely closed.

In other respects, the arrangement of the second embodiment is substantially identical to that of the previous embodiment, with corresponding parts being designated by like reference numerals as used before.

In operation, under normal condition when the solenoid 72 is deenergized, hydraulic fluid discharged from the pump 1 is supplied in its entirety to the power steering apparatus through the supply passage 58 when the discharge is at a low level. As the flow rate of hydraulic fluid discharged from the pump 1 increases, a pressure differential across the pair of orifices 51, 52, and accordingly a pressure difference between the high pressure chamber 48 and the low pressure chamber 57 disposed on the opposite sides of the spool valve 46, increases to drive the spool valve 46 to the left. This allows the high pressure chamber 48 to communicate with the branch passage 59, whereby part of the hydraulic fluid is fed to the branch passage 59, thus allowing the supply of hydraulic fluid to the power steering apparatus to be maintained substantially constant in the similar manner as before.

Subsequently when the discharge from the pump 1 further increases, the pressure differential across the restriction 68 increases to cause the sleeve 66 to be driven to the left, whereby one of the orifices, 52, has its opening being gradually closed. As a consequence, the total flow channel area of the pair of orifices 51, 52 decreases, whereby a pressure differential across the orifices 51, 52 increases to augment the drive applied to the spool valve 46 which causes it to move to the left, thus increasing the flow rate fed to the branch passage 59 while reducing the supply to the power steering apparatus.

On the other hand, when the solenoid 72 is energized, the plunger 74 drives the actuating member 71 to the left, whereby the opening of the passage 54, which forms part of the supply passage 58, is closed and thus the supply passge 58 is closed. Hydraulic fluid from the pump 1 drive the spool valve 46 to the left against the resilience of the spring 45, increasing the open area of the opening of the branch passage 59. In this manner, the fluid circuit is switched, and hydraulic fluid from the pump is supplied in its entirety to the hydraulic winch.

Figure 3:
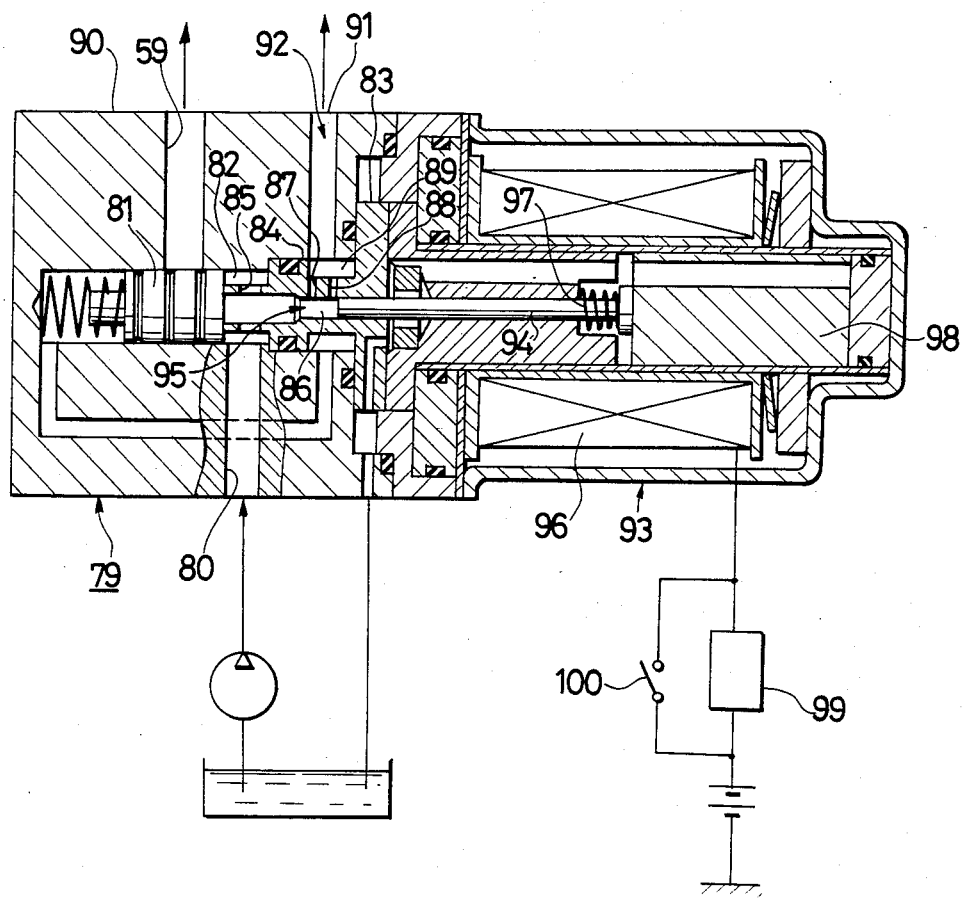

FIG. 3 shows a flow control valve with switching valve 79 according to a further embodiment of the invention which permits the flow rate supplied to a power steering apparatus to be controlled in accordance with the speed of running of a vehicle.

Referring to FIG. 3, the combined valve 79 includes a first passage 80 which is connected to the pump 1 and which communicates with a high pressure chamber 82 defined on the right-hand side of a spool valve 81. The high pressure chamber 82 communicates with a low pressure chamber 89 through a radial passage 85, an axial bore 86, and a pair of radially extending orifices 87, 88, all formed in a projection 84 of a lid 83. The low pressure chamber 89 in turn communicates with a power steering apparatus through a second passage 91 formed in a housing 90.

Accordingly, a supply passage 92 which supplies hydraulic fluid from the pump 1 to the power steering apparatus comprises the first passage 80, the high pressure chamber 82, the radial passage 85, the axial bore 86, the pair of orifices 87, 88, the low pressure chamber 89 and the second passage 91.

The pair of orifices 87, 88 define a variable orifice mechanism 95 having a flow channel area which is controlled in accordance with the running speed of a vehicle, together with an actuating member 94 which defines drive means 93. The actuating member 94 is slidably fitted in the axial bore 86, and a spring 97 urges the actuating member 94, together with an associated plunger 98, to its end of rightward stroke when a solenoid 96 is deenergized, with the left end of the actuating member 94 being disposed at its right-hand position close to the right-hand orifice 88 which defines part of the supply passage 92.

The solenoid 96, which defines part of the drive means 94, is electrically connected to a vehicle speed detector 99 which controls the magnetic force emanating therefrom in accordance with a vehicle speed. The vehicle speed detector 99 may have any construction provided it is capable of controlling the magnetic force from the solenoid 96 in accordance with a vehicle speed detected. When the solenoid 96 is energized in accordance with a vehicle speed by means of the vehicle speed detector 99, the actuating member 94 is driven to the left in accordance with the magnetic force from the solenoid, thus allowing the opening of the orifice 88 and hence its flow control area to be gradually closed in a controllable manner.

The detector 99 is shunted by a switch 100, which when closed to energize the solenoid 96, causes the actuating member 94 to be driven to its end of leftward stroke, thus closing the openings of the both orifices 87, 88 to close the supply passage 92.

In other respects, the arrangement is substantially identical to that of the embodiment shown in FIG. 2, and corresponding parts are designated by like reference numerals.

In operation, when the solenoid 96 is deenergized, hydraulic fluid discharged from the pump 1 is supplied in its entirety to the power steering apparatus through the supply passage 92 if the discharge from the pump 1 is at a low level.

When the flow rate of hydraulic fluid discharged by the pump 1 increases, a pressure differential across the pair of orifices 87, 88 increases to cause the spool valve 81 to be driven to the left, whereupon the high pressure chamber 82 communicates with the branch passage 59 to feed part of the hydraulic fluid into the branch passage 59, thus allowing the supply of hydraulic fluid to the power steering apparatus to be maintained substantially constant as in the previous embodiments.

If now the running speed of a vehicle increases, and the increased speed is detected by the vehicle speed detector 99 to increase the magnetic force from the solenoid 96, the actuating member 94 is driven to the left in a corresponding manner, thus gradually closing the opening of the orifice 88. As a consequence, the combined flow channel area of the pair of orifices 87, 88 decreases, resulting in an increase in the pressure differential across these orifices. This results in an increased stroke of the spool valve 81 to the left, thus increasing the flow rate fed to the branch passage 59 while decreasing the supply to the power steering apparatus.

When the switch 100 is closed and the solenoid 96 is energized at its maximum level, the plunger 98 drives the actuating member 94 through an increased stroke, whereby the openings of the orifices 87, 88 are closed and hence the supply passage 92 is closed. Accordingly, hydraulic fluid from the pump 1 causes the spool valve 81 to move to the left against the resilience of the spring 45, thus increasing the open area of the opening of the branch passage 59. In this manner, the fluid circuit is switched, and the hydraulic fluid from the pump is supplied in its entirety to the hydraulic winch.

In this embodiment, the running speed of a vehicle is detected by means of the detector 99, but it will be apparent that the number of revolutions of an engine may be detected if required.

While the invention has been shown and described above in connection with several embodiments thereof, it should be understood that a number of changes, substitutions and modifications therein will readily occur to one skilled in the art from the above disclosure and hence it is intended that the scope of invention be determined solely on the basis of appended claims.

What is claimed is:

1. Hydraulic apparatus including a pair of hydraulic loads and a combined control and switching valve, comprising:

a supply passage for receiving hydraulic fluid from a pressure source;

a first hydraulic load defining a power steering apparatus connected to the supply passage for supplying by the supply passage of pressurized fluid to the power steering apparatus, the power steering apparatus being of the kind which upon operation thereof increases the hydraulic pressure in said supply passage;

a branch passage;

a second hydraulic load selected from a group comprising a hydraulic winch and hydraulic lifter and a hydraulic dumper, and connected to the branch passage for supplying by the branch passage of pressurized fluid to the second hydraulic load;

an orifice formed in said supply passage;

spool valve means shiftable for feeding part of the hydraulic fluid supplied to the supply passage to the branch passage in response to a pressure differential across the orifice;

drive means for causing a displacement of the spool valve means to open the branch passage while closing the supply passage, said drive means including a solenoid and an actuating member which is displaced by energizing the solenoid from an inoperative position in which said branch passage is closed to an operative position in which said branch passage is open, the drive means also including means rendering said actuating member also responsive to the hydraulic pressure in said supply passage for causing the hydraulic pressure in the supply passage to hold the actuating member at its inoperative position when hydraulic pressure in the supply passage is increased due to the power steering apparatus being operated, the force supplied by the energized solenoid to urge the actuating member from its inoperative position to its operative position being lower than the force applied by the hydraulic pressure in the supply passage on the actuating member when the power steering apparatus is operated;

whereby during operation of the power steering apparatus, the actuating member is not displaced from its inoperative position to its operative position even by energization of the solenoid, and pressure fluid is not switched to the branch passage.

2. Flow control valve with switching valve according to claim 1 in which the drive means is mechanically coupled to the spool valve, thereby forcibly displacing the spool valve to open the branch passage and to close the supply passage.

3. Flow control valve with switching valve according to claim 1 in which the drive means controls the opening or closing of the supply passage, with a fluid pressure which obtains when the supply passage is closed causing a displacement of the spool valve to thereby open the branch passage.

4. Flow control valve with switching valve according to claim 1 in which the orifice defines part of a variable orifice mechanism, the variable orifice mechanism comprising a sleeve which is slidably disposed to control a flow channel area through the orifice in accordance with a position thereof, and a restriction defined by the periphery of the sleeve and the internal surface of a bore in which the sleeve is received and which defines part of the supply passage, a pressure differential between the upstream and the downstream side of the restriction being effective to cause a sliding movement of the sleeve to control the flow channel area of the orifice.

5. Flow control valve with switching valve according to claim 1 including means for displacing the actuating member which is displaced in accordance with a running speed of a vehicle to control the flow channel area of the orifice.

* * * * *